Oct. 15, 1935.   R. F. RUTHRUFF   2,017,325
POLYMERIZATION OF GASES
Filed Aug. 24, 1932
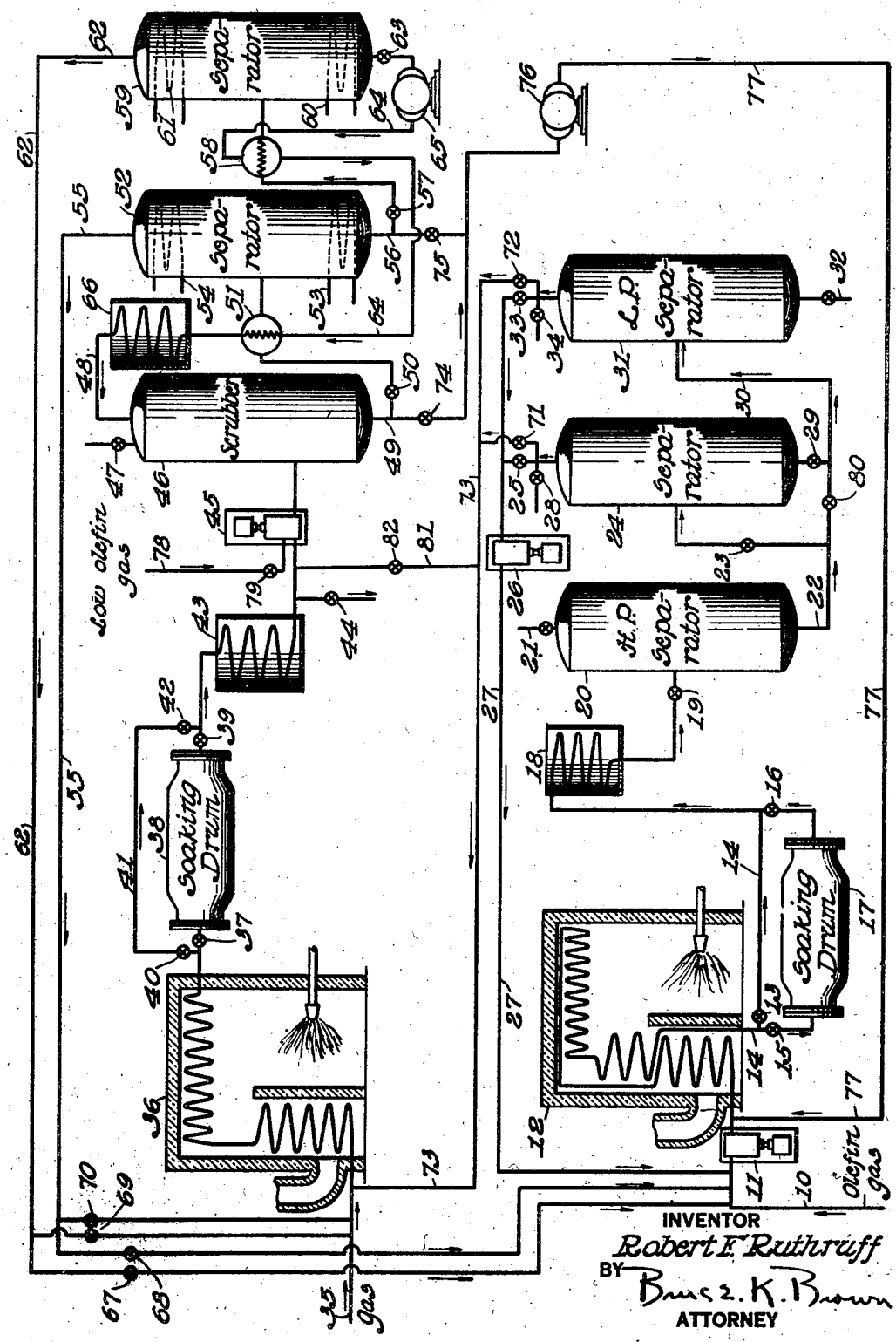
INVENTOR
Robert F. Ruthruff
BY Bruce K. Brown
ATTORNEY Patented Oct. 15, 1935

2,017,325

UNITED STATES PATENT OFFICE 2,017,325

POLYMERIZATION OF GASES

Robert F. Ruthruff, Hammond, Ind., assignor to Standard Oil Company, Chicago, Ill., a corporation of Indiana Application August 24, 1932, Serial No. 630,282

REISSUED

9 Claims. (Cl. 196—10)

My invention relates to an improved process for obtaining low boiling liquid products by the polymerization of olefinic gases.

It is well known that olefinic gases can be polymerized at elevated temperatures and pressures to yield low boiling liquid products. These olefinic gases may be produced by high temperature cracking of saturated or paraffinic gases. Furthermore, such polymerization systems and such cracking systems may be advantageously operated in combination with each other as is disclosed in co-pending application, Sullivan and Ruthruff, Serial No. 577,226. In the Sullivan and Ruthruff process cracked gases are scrubbed with oil at elevated pressures, undissolved methane, hydrogen, etc., are eliminated and the thus concentrated olefinic gases are polymerized. After the polymerization step, fixed gases undissolved by the liquid polymerization products are eliminated by a high pressure separator, and low pressure gases subsequently released from the polymerization products are recycled to the polymerization system and/or to the cracking system.

I have discovered that by carrying out the separation between the scrubbing medium and dissolved gases, and also the separation between liquid polymerization products and dissolved unreacted gases, in a plurality of stages subsequent to an initial high pressure separation and removal of undissolved fixed gases, certain gas fractions of unexpectedly high olefin content may be obtained and may be so combined and recycled as to considerably increase the olefin content of the gas charged to the polymerization system.

Briefly described, the operation of my system is as follows:

Considering first the polymerization system, olefinic gases are polymerized in a suitable heater with or without a soaking drum at temperatures above 750° F. and ordinarily of 850–1000° F. and pressures of 500–3000 pounds, the reaction time being from 0.5 to 20 minutes, and ordinarily from 1–10 minutes. Subsequent to this step all gases and products are cooled and fixed gases are separated at substantially full reaction pressure. The pressure on the liquid products and dissolved gases from the high pressure separator is released in two or more stages. Varying proportions of the gas released from the several stages are recycled to the polymerization step. I may, for example, (subsequent to the initial high pressure step) first separate a gas of low olefin content and then one of high olefin content, the first separated gas being eliminated from the system and the second recycled. On the other hand, I may use more than two separation steps and also I may recycle varying proportions of the gases from the several stages instead of completely eliminating any one stream from the system.

The number of stages used, the exact pressure maintained in each, and the composition and disposition of the gas released in each stage (i. e. whether recycled or eliminated) will, of course, depend on the composition of the unreacted gases leaving the polymerization step, which, in turn, will depend on the composition of the fresh olefin gases fed to the system and on the exact conditions maintained therein.

I may also operate my process in conjunction with a gas cracking step. In this case saturated gases are cracked at elevated temperatures and relatively low pressures. The resulting low olefin content gas is cooled and scrubbed under higher pressures, the fixed gases are eliminated, the scrubbing oil and dissolved gases are separated stepwise in a plurality of stages and gases are removed from each stage. The gas separated from each stage is controllably (1) recycled to the cracking step, (2) delivered to the polymerization system, and (3) divided between (1) and (2) in determined proportion so as to establish optimum ultimate yield conditions.

When my polymerization system is operated in conjunction with a gas-cracking system, low olefin content gases separated in one or more of the plurality of gas-product separators following the high pressure separator of the polymerization system are not discarded, but are returned to the gas-cracking step.

Suitable apparatus for carrying out my process is shown diagrammatically in the attached drawing which represents an elevational view thereof, and which forms part of this specification.

The operation of my process in detail is as follows:

Referring to the drawing and considering first the polymerization system alone. Relatively concentrated olefin gases containing over 50% of gaseous olefins enter through line 10 and are compressed by pump 11 to 500–3000 pounds per square inch and introduced into the heating coils of heater 12, wherein the gases are heated to 750–1000° F. Heater 12 may contain preheating and soaking coils in which the reactions are completed, or it may function solely as a preheater in which case valve 13 in exit line 14 is closed, valves 15 and 16 are opened, whereby the polymerization reactions are permitted to complete themselves in soaking chamber 17. In either case, all gases and products are cooled in cooler 18 and passed through valve 19 into high pressure separator 20. Separator 20 is ordinarily operated at full reaction pressure, but a slight reduction of pressure may be made at valve 19 if desired. The fixed gases which are not susceptible to further reaction or even to re-cracking to olefins are eliminated through 21 and products containing dissolved gases are drawn out through 22, the pressure reduced at valve 23 and said products and gases are introduced into intermediate separator 24. Gases may be removed from separator 24, through valve 25, pump 26 and line 27 for recycling to the polymerization step, or may be wholly or partly vented from the system through valve 28. Liquids and remaining dissolved gases are removed through valve 29 and line 30, wherein the pressure is further reduced and are introduced into low pressure separator 31 from which essentially gas-free products are withdrawn through 32, while gases may be recycled through 33 or wholly or partly vented from the system through 34.

As previously stated I may operate my system in conjunction with a gas-cracking system, in fact, I may carry out the entire operation starting with essentially saturated or paraffinic gases.

Referring again to the drawing, if this set-up be used, predominantly saturated gases enter through line 35 and are cracked at temperatures of 1300–1750° F. and 0 to 100 lbs. per square inch pressure above atmospheric or thereabouts in heater 36, from which these gases either pass through valve 37, soaking chamber 38 and valve 39, or may be passed through valves 40, by-pass 41 and valve 42. In either case the gases are essentially completely cooled in cooler 43, following which any liquid condensates may be drawn off through 44 prior to compression of the gases by pump 45 and injection of said compressed gases into scrubber 46. In the scrubber 46 the gases which have an olefin content of not over 50% by volume (and ordinarily of less than 40% olefins by volume) are contacted with a suitable scrubbing oil whereby olefinic hydrocarbons (and to a somewhat lesser extent the satrated hydrocarbons having two or more carbon atoms) are dissolved. Fixed gases, such as hydrogen or methane, are eliminated through 47, cool scrubbing oil being introduced through line 48, while enriched oil is withdrawn through 49 and valve 50, passed through interchanger or heater 51 and introduced into intermediate separator 52. Separator 52 may be equipped with suitable heating means 53 at a low point therein and may be provided with cooling means 54 at an upper point therein. Gases driven off in 52 are withdrawn through line 55, while the liquid and still remaining dissolved gases are withdrawn through 56 and valve 57, passed through heat interchanger or heater 58 and enter separator 59 which likewise may be provided with heating means 60 and cooling means 61. Gases driven off in this separator are removed thru line 62, while stripped scrubbing oil is removed through valve 63 and line 64 and recycled by pump 65, passing optionally through heat exchangers 58 and 51 and finally through a cooler 66 prior to reintroduction into scrubber 46 through line 48.

The gases in lines 55 and 62 eliminated respectively from separators 52 and 59 may be optionally passed through valves 67 and 68 to inlet line 10 of the previously described polymerization system or through valves 69 and 70 respectively to the inlet line 35 of the cracking system.

In the simpler and preferred modification of my process I use two separation steps subsequent to the initial separation of fixed gases, both in the polymerization system and in the olefin gas concentration system. In this case essentially all of the gas from the first separator or separators is passed to the polymerizing system inlet, while essentially all of the gas from the second separator or separators is eliminated from the system, or retrned to the gas cracking step, or vice versa.

It will be understood that altho I have shown the use of separation of dissolved gases by stepwise reheating in the olefin concentration step and by stepwise pressure reduction in the polymerization product separators, I do not limit myself to this arrangement but may use stepwise reheating in either or both systems, or stepwise pressure reduction in either or both systems. I may, however, use more than two intermediate separators following the high pressure separator 20 or scrubber 46. The distribution of gases from each separator between inlet 35 to the cracking system or inlet 10 of the polymerization system will be so determined as to give the optimum concentration of olefin gas entering the polymerization system and will be dependent upon the composition of the original gas fed to the cracking or polymerization step through line 35 or line 10, on the exact conditions maintained during the cracking and polymerization steps and on the exact conditions maintained in the scrubber 46 and separator 20 and the separators following thereafter.

If my polymerization system be so operated in conjunction with a gas cracking system, instead of eliminating from the system gases from separators 24 or 31 of the polymerization system through vents 28 or 34 respectively, any gases from these separators that are not desirable for recycling to the polymerizing step through line 27 will be drawn off through 71 and 72 respectively, and passed through line 73 to inlet 35 of the gas cracking step.

I may also under certain conditions prefer to operate my polymerization step in the presence of certain amounts of liquid oil. In such case I may draw off regulated portions of scrubbing oil containing dissolved olefins from separators 46 and/or 52 through valves 74 and 75 respectively and inject said materials by pump 76 through line 77 into the inlet 10 to the polymerization heater 12.

I may also operate my polymerization system in conjunction with the olefin concentration system represented by 45 to 68 but without the gas cracking system 35—44. In this case I may operate on low olefin content gases obtained or produced from any suitable source which are introduced through line 78 and valve 79 into the intake of pump 45. In this case the operation of all other parts of my system is as previously described. It will also be evident that the olefin concentration system 45—68 may be operated independently in order to produce a rich olefin gas for any purpose from lean olefin gas from any source.

If I operate my polymerization system in conjunction with the cracking system and make use of three or more separators in my olefin concentration system 45—66, then I may under certain circumstances make use of only two stages of separation between polymerization products and unreacted gases from the polymerization system. In this case I open valve 80 and close valves 23, 25, 29, and 71, thereby eliminating the intermediate separator 24. All other details of operation of my system will remain as previously described.

If I operate my polymerization system in conjunction with the olefin concentration system 45 to 68, but without the gas cracking system, I may make use of line 81 and valve 82 whereby I may divert gas released from one or more of the separators 24, 31, etc. back to the olefin concentration step.

Altho as previously stated I do not limit myself to the use of only two intermediate separators subsequent to the initial fixed gas separator, I prefer to use only two such separators. I also prefer to select my starting materials and to operate my polymerization and/or cracking systems and my separators so that an olefinic gas is separated in the first intermediate separator and a low olefin content gas in the second intermediate separator. This type of operation has the added advantage that the olefinic gas which is to be recycled to the high pressure polymerization system is in all cases obtained or recovered at the highest possible pressure, whereby considerable operating economies are realized.

It will be understood that scrubber 46 and separator 20, 24, 31, 52, and 59 may be provided with bubble or baffle plates and/or any other conventional means for improving scrubbing or separations respectively therein. Wherever the term "substantially full reaction pressure" is used herein or in the claims hereof with respect to the operating conditions of high pressure separator 20, this is to be understood as being subject to the qualification that frequently it is preferable not to operate the said separator at pressures above 2,000 lbs. per square inch since at the temperatures attainable with ordinary cooling water, separation of phases is frequently not satisfactory at higher pressures than this. In case, therefore, that I make use of reaction pressures of above 2,000 lbs. I may reduce pressure to at least that point by valve 19 prior to high-pressure separator 20.

By "low olefin content gases", where this term is used herein, I refer to gases having olefin contents of less than 50% and ordinarily of more than 20%. By "predominatingly saturated" gases, such as I may use as charging material for the high temperature gas cracking step, I refer to gases containing 20% or less of gaseous olefins or containing none thereof. By "olefinic gases" or "olefinic gas" I refer to gases having an olefin content of 50% or more and preferably of more than 65% such as may be obtained by the concentration steps described herein or may be obtained from other sources.

The foregoing being a full and complete description of my invention:

I claim:

1. In a process for the polymerization of olefinic gases at temperatures of 750–1000° F. and under pressures of 500–3000 lbs. per sq. in., the steps of separating liquid products from unreacted gases in at least three stages at progressively lower pressures, separating fixed gases from products in the first stage, eliminating fixed gases from the system, separating olefinic gas from at least one stage subsequent to the first stage and recycling substantially all of said gas directly to the polymerization step, and eliminating the predominatingly saturated gases separated in the other stages from the system.

2. In a process for the polymerization of olefinic gases at temperatures of 750–1000° F. and under pressures of 500–3000 lbs. per sq. in., the steps of separating fixed gases from products at substantially full reaction pressure and relatively low temperature and eliminating said fixed gases from the system, separating remaining gases from liquid products in at least two subsequent stages at progressively lower pressures, separating olefinic gas from at least one stage and recycling substantially all of said gas directly to the polymerization step, and eliminating the predominatingly saturated gases separated in the other stages from the system.

3. In a process for the polymerization of olefinic gases at temperatures of 750–1000° F. and under pressures of 500–3000 lbs. per sq. in., the steps of separating liquid products from unreacted gases in at least three stages at progressively lower pressures, eliminating substantially all gases from the first stage from the system, recycling olefinic gases from at least one stage directly to the polymerization step, subjecting predominatingly saturated gases from at least one stage to cracking at 1300°–1750° F. to obtain additional olefinic gases therefrom, and returning said olefinic gases to the polymerization step.

4. In a process for the polymerization of olefinic gases at temperatures of 750–1000° F. and under pressures of 500–3000 lbs. sq in., the steps of separating liquid products from unreacted gases in three stages wherein the first stage is at substantially full reaction pressure and relatively low temperature and the subsequent stages are at progressively lower pressures, eliminating fixed gases from said first separating stage from the system, recycling olefinic gases from the second separating stage directly to the polymerization step, and eliminating predominantly saturated gases from the third separating stage from the system.

5. In a process for the polymerization of olefinic gases at temperatures of 750–1000° F. and under pressures of 500–3000 lbs. per sq. in., the steps of separating liquid products from unreacted gases in three stages wherein the first stage is at substantially full reaction pressure and relatively low temperature and the subsequent stages are at progressively lower pressures, eliminating fixed gases from said first stage from the system, recycling olefinic gases from the second stage directly to the polymerization step, subjecting predominatingly saturated gases from the third separating stage to cracking at 1300–1750° F. to obtain additional olefinic gases therefrom, and returning said olefinic gases to the polymerization step.

6. In a process for the production of liquid products from low olefin content gases, the steps of scrubbing said gases with oil at elevated pressure, eliminating undissolved gases separating dissolved gases from the oil in at least two subsequent stages at progressively lower pressures, recovering olefinic gas from at least one of said stages, polymerizing said olefinic gas to liquid products at temperatures of 750–1000° F. and under pressures of 500–3000 lbs. per sq. in., separating said liquid products from unreacted gases in at least three stages wherein the first stage is at substantially full reaction pressure and at relatively low temperature and the subsequent stages are at progressively lower pressures, eliminating undissolved fixed gases from the first separating stage from the system, separating dissolved gases from liquid products in at least two subsequent stages, separating olefinic gas from at least one of said stages, recycling said gas directly to the polymerization step, and separating low olefin content gas from at least one of said stages and returning said gas to the oil scrubber of the olefin concentration step.

7. In a process for the production of liquid products from predominatingly saturated gases, the steps of cracking said gases at temperatures of 1300–1750° F., scrubbing cracked gases with oil at elevated pressures, eliminating undissolved gases, separating dissolved gases from scrubbing oil in at least two subsequent stages at progressively lower pressures, recovering olefinic gas from at least one of said stages, recycling predominatingly saturated gases from at least one of said stages directly to the gas cracking step, polymerizing aforesaid olefinic gas at temperatures of 750–1000° F. and under pressures of 500–3000 lbs. per sq. in., separating unreacted gases from liquid products in at least three stages at progressively lower pressures, eliminating gases separated in the first stage from the system, recycling olefinic gas separated from at least one stage directly to the polymerization step, and recycling predominatingly saturated gases separated from at least one stage directly to the first named gas cracking step.

8. In a process for the production of liquid products from low olefin content gases, the steps of scrubbing said gases with oil at elevated pressure, eliminating undissolved fixed gases, recovering olefinic gas in a second separating stage, polymerizing said olefinic gas to liquid products at temperatures of 750–1000° F. and under pressures of 500–3000 lbs. per sq. in., separating said liquid products from unreacted gases in three stages wherein the first stage is at substantially full reaction pressure and at relatively low temperature and subsequent stages are at progressively lower pressures, eliminating fixed gases from the first separation stage from the system, separating olefinic gas from the second stage, recycling said gas directly to the polymerization step, separating low olefin content gas from the third stage, and returning said gas to the oil scrubber of the olefin concentration step.

9. In a process for the production of liquid products from predominatingly saturated gases, the steps of cracking said gases at temperatures of 1300–1750° F., scrubbing cracked gases with oil at elevated pressures, eliminating undissolved gases, separating dissolved gases from scrubbing oil in two stages at progressively lower pressures, recovering olefinic gas from the first stage, recycling predominatingly saturated gases from the second stage directly to the cracking step, polymerizing aforesaid olefinic gas at temperatures of 750–1000° F. and under pressures of 500–3000 lbs. per sq. in., separating unreacted gases from liquid products in three stages wherein the first is at substantially full reaction pressure and relatively low temperature and subsequent stages are at progressively lower pressures, eliminating fixed gases separated in the first stage from the system, recycling olefinic gas separated in the second stage directly to the polymerization step, and recycling gases separated in the third stage directly to the first-named gas cracking step.

ROBERT F. RUTHRUFF.